(12) United States Patent
Xiong et al.

(10) Patent No.: US 12,280,460 B1
(45) Date of Patent: Apr. 22, 2025

(54) MONORAIL INDEPENDENT DUAL-SLIDER SYNCHRONOUS BELT SLIDING TABLE MODULE COMPONENT WITH COMPACT STRUCTURE

(71) Applicant: INTELLIGENT EQUIPMENT RESEARCH CENTER, BEIJING ACADEMY OF AGRICULTURE AND FORESTRY SCIENCES, Beijing (CN)

(72) Inventors: Ya Xiong, Beijing (CN); Yang Chen, Beijing (CN)

(73) Assignee: INTELLIGENT EQUIPMENT RESEARCH CENTER, BEIJING ACADEMY OF AGRICULTURE AND FORESTRY SCIENCES, Beijing (CN)

( * ) Notice: Subject to any disclaimer, the term of this patent is extended or adjusted under 35 U.S.C. 154(b) by 0 days.

(21) Appl. No.: 18/810,748

(22) Filed: Aug. 21, 2024

(30) Foreign Application Priority Data

Oct. 24, 2023 (CN) .......................... 202311378895.8

(51) Int. Cl.
    B23Q 1/58 (2006.01)
(52) U.S. Cl.
    CPC ..................... B23Q 1/58 (2013.01)
(58) Field of Classification Search
    CPC ........................................... B23Q 1/58
    USPC ....................................... 198/468.9
    See application file for complete search history.

(56) References Cited

U.S. PATENT DOCUMENTS 6,308,821 B1 * 10/2001 Asai ................... F15B 15/228
                                                198/750.7

FOREIGN PATENT DOCUMENTS

| CN | 202897421 U |   | 4/2013 |
| CN | 104889747   | * | 9/2015 |
| CN | 205704157 U |   | 11/2016 |
| DE | 4216899     | * | 11/1992 |

OTHER PUBLICATIONS

First Office Action issued Dec. 5, 2023 in corresponding Chinese Patent Application No. 202311378895.8 (English translation).

* cited by examiner

Primary Examiner — Gene O Crawford
Assistant Examiner — Lester Rushin, III
(74) Attorney, Agent, or Firm — Miles & Stockbridge PC; Ajay A. Jagtiani

(57) ABSTRACT

Provided is a monorail independent dual-slider synchronous belt sliding table module component with a compact structure, which includes a sliding table base module, a sliding table module, a first driving end module and a second driving end module. A first slide rail and a second slide rail are spaced from each other to form a transmission groove. A first slider is provided with a first transmission part corresponding to the transmission groove, a second slider is convexly provided with a second transmission part corresponding to the transmission groove, and the second transmission part is provided with an avoidance part which is in a same horizontal plane as the first transmission part. A first synchronous belt is arranged in an extension direction of the transmission groove, is in transmission connection with the first transmission part after passing through the avoidance part, and is sleeved outside the second synchronous belt.

15 Claims, 5 Drawing Sheets

MONORAIL INDEPENDENT DUAL-SLIDER SYNCHRONOUS BELT SLIDING TABLE MODULE COMPONENT WITH COMPACT STRUCTURE

CROSS-REFERENCE TO RELATED APPLICATION

This patent application claims the benefit and priority of Chinese Patent Application No. 202311378895.8, entitled "MONORAIL INDEPENDENT DUAL-SLIDER SYNCHRONOUS BELT SLIDING TABLE MODULE COMPONENT WITH COMPACT STRUCTURE" filed on Oct. 24, 2023, the disclosure of which is incorporated by reference herein in its entirety as part of the present application.

TECHNICAL FIELD

The present disclosure relates to the technical field of industry automation, and in particular to a monorail independent dual-slider synchronous belt sliding table module component with a compact structure.

BACKGROUND

The existing synchronous belt sliding table module is mainly composed of a belt, a linear guide rail, an aluminum alloy profile, a coupling, a motor, a photoelectric switch and the like. Transmission shafts on both sides of the linear module are used as power input shafts, and a slider for installing device workpieces is fixed with the belt. When there is an input, the slider is driven to move through the belt.

The existing monorail synchronous belt sliding table module component can make the movement of one or more sliders in one direction, but cannot satisfy to arrange load structures with special requirements on the multiple sliders to move in the same direction and opposite directions independently. When multiple module components are arranged in parallel, the working requirement of the independent movement can be satisfied. However, the module components are large in axial occupied space, and are not suitable for some working occasions with small installation spaces.

SUMMARY

The present disclosure provides a monorail independent dual-slider synchronous belt sliding table module component with a compact structure to solve the technical defects that the sliding table module component in the prior art is large in occupied space and is inconvenient to arrange. The miniaturization of the sliding table module component is achieved, and the two sliders can independently move in the same direction and opposite directions independently. The sliding table module component has the advantages of compact overall structure, lightweight design and high control accuracy.

A monorail independent dual-slider synchronous belt sliding table module component with a compact structure includes:
  a sliding table base module, provided with a first slide rail and a second slide rail arranged in parallel, where the first slide rail and the second slide rail are spaced from each other to form a transmission groove;
  a sliding table module, connected with the first slide rail and the second slide rail and capable of moving in an extension direction of the sliding table base module, where the sliding table module includes a first slider and a second slider, the first slider is provided with a first transmission part corresponding to the transmission groove, the second slider is convexly provided with a second transmission part corresponding to the transmission groove, and the second transmission part is provided with an avoidance part which is located in a same horizontal plane as the first transmission part;
  a first driving end module, arranged at one end of the sliding table base module, where the first driving end module includes a first synchronous belt which is arranged in an extension direction of the transmission groove and is in transmission connection with the first transmission part after passing through the avoidance part; and
  a second driving end module, arranged at an other end of the sliding table base module, where the second driving end module includes a second synchronous belt which is in transmission connection with the second transmission part, the first synchronous belt is sleeved outside the second synchronous belt, and the first synchronous belt and the second synchronous belt are located in a same vertical plane.

According to the monorail independent dual-slider synchronous belt sliding table module component with a compact structure provided by the present disclosure, the second slider is provided with a first sub-part and a second sub-part which are spaced from each other. The first sub-part and the second sub-part are arranged corresponding to the first slide rail and the second slide rail, respectively. The second transmission part is connected between the first sub-part and the second sub-part, and the avoidance part is an avoidance groove. One side, away from the avoidance groove, of the second transmission part is provided with a first positioning sub-part, and the first positioning sub-part is connected with the second synchronous belt.

According to the monorail independent dual-slider synchronous belt sliding table module component with a compact structure provided by the present disclosure, the sliding table base module includes a mounting seat and a sliding table body. The mounting seat is provided with a mounting groove, and the sliding table body is embedded into the mounting groove. A middle portion of the sliding table body is recessed towards the mounting groove to form the transmission groove, and the first slide rail and the second slide rail are arranged on both sides of a notch of the transmission groove, respectively.

According to the monorail independent dual-slider synchronous belt sliding table module component with a compact structure provided by the present disclosure, the sliding table module further includes multiple sliders, the multiple sliders are arranged between the first slider as well as the second slider and the first slide rail as well as the second slide rail, and the first slider and the second slider are fixedly connected with the multiple sliders.

According to the monorail independent dual-slider synchronous belt sliding table module component with a compact structure provided by the present disclosure, the first driving end module includes a first driving member, a first driving seat, a first driving shaft and a first driven shaft. The first driving shaft and the first driven shaft are rotatably connected with the first driving seat, respectively. One end of the first synchronous belt is sleeved on the first driving shaft, the second synchronous belt is sleeved on the first driven shaft, and the first driving member is configured to drive the first driving shaft to drive the first synchronous belt to rotate.

According to the monorail independent dual-slider synchronous belt sliding table module component with a compact structure provided by the present disclosure, the first driving shaft and the first driven shaft are arranged in parallel, and the first driven shaft is arranged between the first driving shaft and the sliding table module.

According to the monorail independent dual-slider synchronous belt sliding table module component with a compact structure provided by the present disclosure, the second driving end module includes a second driving member, a second driving seat, a second driving shaft and a second driven shaft. The second driving shaft and the second driven shaft are rotatably connected with the second driving seat. One end of the second synchronous belt is sleeved on the second driving shaft, the first synchronous belt is sleeved on the second driven shaft, and the second driving member is configured to drive the second driving shaft to drive the second synchronous belt to rotate.

According to the monorail independent dual-slider synchronous belt sliding table module component with a compact structure provided by the present disclosure, the second driving shaft and the second driven shaft are arranged in parallel, and the second driving shaft is arranged between the second driven shaft and the sliding table module.

According to the monorail independent dual-slider synchronous belt sliding table module component with a compact structure provided by the present disclosure, a radius of the first synchronous belt is greater than a radius of the second synchronous belt.

According to the monorail independent dual-slider synchronous belt sliding table module component with a compact structure provided by the present disclosure, the monorail independent dual-slider synchronous belt sliding table module component with a compact structure further includes a first limit switch and a second limit switch. The first limit switch is arranged at one side, adjacent to the first slide rail or the second slide rail, of the first driving end module, and the second limit switch is arranged at one side, adjacent to the first slide rail or the second slide rail, of the second driving end module.

According to the monorail independent dual-slider synchronous belt sliding table module component with a compact structure provided by the embodiments, the first transmission part and the second transmission part are arranged corresponding to the transmission groove, and the first driving end module and the second driving end module are independently designed. The second transmission part is provided with an avoidance part for avoiding the first synchronous belt which drives the first transmission part. Therefore, the first synchronous belt and the second synchronous belt are located in the same vertical plane, and the miniaturization of the sliding table module component is achieved while making the two sliders move in the same direction or in opposite directions independently. Compared with the traditional sliding table system, the sliding table module component provided by the embodiments occupies less space and is suitable for application scenes with limited space or high space requirements. In addition, the first synchronous belt is arranged in the extension direction of the transmission groove, and is in transmission connection with the first transmission part after passing through the avoidance part. The second synchronous belt is in transmission connection with the second transmission part, the first synchronous belt is sleeved outside the second synchronous belt, and the first synchronous belt and the second synchronous belt are located in the same vertical plane, thus ensuring the synchronism of the sliders and the synchronous belts in the movement process, and improving the control accuracy.

BRIEF DESCRIPTION OF THE DRAWINGS

To describe the technical solutions of the present disclosure or in the prior art more clearly, the following briefly introduces the drawings required for describing the embodiments or the prior art. Apparently, the drawings in the following description show merely some embodiments of the present disclosure, and those of ordinary skill in the art may still derive other drawings from these drawings without creative efforts.

LIST OF THE REFERENCE CHARACTERS

Figure 1:
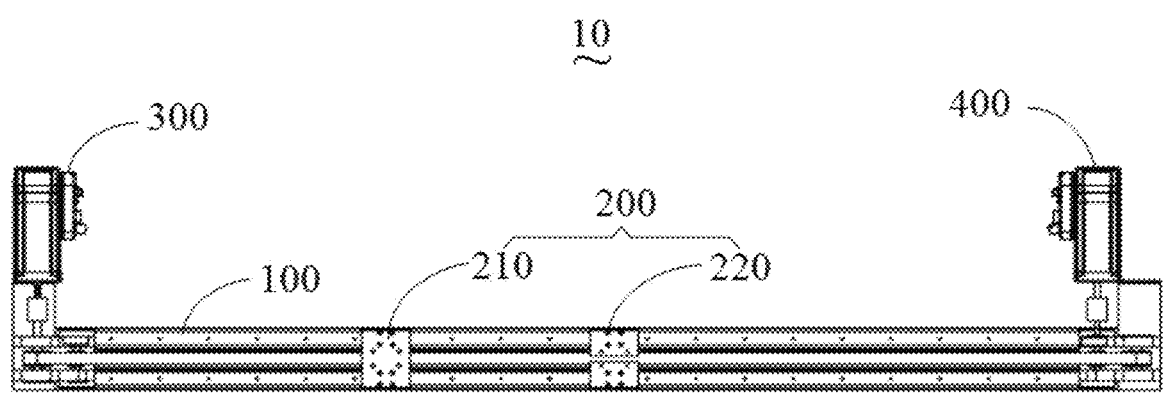
FIG. 1 is a structural schematic diagram of an embodiment of a monorail independent dual-slider synchronous belt sliding table module component with a compact structure according to the present disclosure.

10 monorail independent dual-slider synchronous belt sliding table module component with compact structure;

100 sliding table base module; 110 first slide rail; 120 second slide rail; 130 mounting seat; 140 sliding table body; 141 transmission groove;

200 sliding table module; 210 first slider; 211 first transmission part; 220 second slider; 221 second transmission part; 221a avoidance groove; 221b first positioning sub part; 223 first sub part; 224 second sub part; 230 slider;

300 first driving end module; 310 first synchronous belt; 320 first driving member; 330 first driving seat; 340 first driving shaft; 350 first driven shaft;

400 second driving end module; 410 second synchronous belt; 420 first driving member; 430 first driving seat; 440 first driving shaft; 450 first driven shaft;

500 first limit switch;

600 second limit switch.

DETAILED DESCRIPTION OF THE EMBODIMENTS

To make the objectives, technical solutions and advantages of the present disclosure more clearly, the following clearly and completely describes the technical solutions in the embodiments of the present disclosure with reference to the drawings in the embodiments of the present disclosure. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

In the description of the present disclosure, it needs to be understood that the orientation or positional relationship indicated by terms "center", "longitudinal", "transverse", "upper", "lower", "front", "rear", "left", "right", "vertical", "horizontal", "top", "bottom", "inside" and "outside" is based on the orientation or positional relationship shown in the drawings only for convenience of description of the present disclosure and simplification of description rather than indicating or implying that the apparatus or element referred to must have a particular orientation, be constructed and operate in a particular orientation, and thus are not to be construed as limiting the present disclosure. Furthermore, the terms "first" and "second" are used for descriptive purposes only and are not to be construed as indicating or implying relative importance.

In the description of the embodiments of the present disclosure, it should be noted that, unless expressly specified and limited otherwise, the terms "connected" and "connection" should be understood broadly, e.g., either a fixed connection or a detachable connection, or an integrated connection; a mechanical connection or an electrical connection; a direct connection or an indirect connection through an intermediate medium, may be an internal communication between the two elements or interactions between the two elements. For those of ordinary skill in the art, the specific meanings of the above terms in the embodiments of the present disclosure can be understood on a case-by-case basis.

A monorail independent dual-slider synchronous belt sliding table module component with a compact structure is provided.

In an embodiment of the present disclosure, as shown in FIG. 1 to FIG. 5, the monorail independent dual-slider synchronous belt sliding table module component with a compact structure 10 includes a sliding table base module 100, a sliding table base 200, a first driving end module 300 and a second driving end module 400. A first slide rail 110 and a second slide rail 120 are arranged on the sliding table base module 100 in parallel, and are spaced from each other to form a transmission groove 141. The sliding table module 200 is connected with the first slide rail 110 and the second slide rail 120, and is able to move in an extension direction of the sliding table base module 100. The sliding table module 200 includes a first slider 210 and a second slider 220. The first slider 210 is provided with a first transmission part 211 corresponding to the transmission groove 141, the second slider 220 is convexly provided with a second transmission part 221 corresponding to the transmission groove 141, and the second transmission part 221 is provided with an avoidance part which is in the same horizontal plane as the first transmission part 211. The first driving end module 300 is arranged at one end of the sliding table base module 100, and includes a first synchronous belt 310. The first synchronous belt 310 is arranged in an extension direction of the transmission groove 141, and is in transmission connection with the first transmission part 211 after passing through the avoidance part. The second driving end module 400 is arranged at the other end of the sliding table base module 100, and includes a second synchronous belt 410. The second synchronous belt 410 is in transmission connection with the second transmission part 221. The first synchronous belt 310 is sleeved outside the second synchronous belt 410, and the first synchronous belt 310 and the second synchronous belt 410 are located in the same vertical plane.

Specifically, in this embodiment, the monorail independent dual-slider synchronous belt sliding table module component 10 with a compact structure includes the sliding table base module 100, the sliding table module 200, the first driving end module 300 and the second driving end module 400. According to the present disclosure, the sliding table base module 100, the first driving end module 300 and the second driving end module 400 are in modular design, which facilitates the disassembly and assembly of the monorail independent dual-slider synchronous belt sliding table module component 10 with a compact structure, thus being spliced into a whole. Specifically, the sliding table base module 100 includes the first slide rail 110 and the second slide rail 120 arranged in parallel. The transmission groove 141 is formed between the first slide rail 110 and the second slide rail 120. The first slide rail 110 and the second slide rail 120 provide moving tracks for the sliding table module 200 on the sliding table base module 100, and the transmission groove 141 is configured for transmitting a driving force and controlling a position of the sliding table module 200. The sliding table module 200 is connected with the first slide rail 110 and the second slide rail 120, and is capable of moving in an extension direction of the sliding table base module 100. The sliding table module 200 includes the first slider 210 and the second slider 220. The first slider 210 is provided with the first transmission part 211 corresponding to the transmission groove 141, the second slider 220 is convexly provided with the second transmission part 221 corresponding to the transmission groove 141, and the second transmission part 221 is provided with the avoidance part which is in the same horizontal plane as the first transmission part 211. The sliding table module 200 is connected with the slide rail to achieve the smooth movement on the sliding table base module 100. The first transmission part 211 and the second transmission part 221 ensure the synchronous movement of the sliding table module 200 through the design of the transmission groove 141, and the avoidance part enables the two transmission parts to work on the same horizontal plane. The first driving end module 300 is arranged at one end of the sliding table base module 100, and includes the first synchronous belt 310. The first synchronous belt 310 is arranged in the extension direction of the transmission groove 141, and is in transmission connection with the first transmission part 211 after passing through the avoidance part. The first driving end module 300 provides a driving force and position control for the sliding table module 200 on the slide rail through the transmission of the first synchronous belt 310. The second driving end module 400 is arranged at the other end of the sliding table base module 100, and includes the second synchronous belt 410. The second synchronous belt 410 is in transmission connection with the second transmission part 221. The first synchronous belt 310 is sleeved outside the second synchronous belt 410, and the first synchronous belt 310 and the second synchronous belt 410 are located in the same vertical plane. The second driving end module 400 can achieve bidirectional driving of the sliding table module 200 through the transmission connection of the second synchronous belt 410 and the second slider 220.

According to the monorail independent dual-slider synchronous belt sliding table module component 10 with a compact structure provided by the present disclosure, the first transmission part 211 and the second transmission part 221 are arranged corresponding to the transmission groove 141, and the first driving end module 300 and the second driving end module 400 are independently designed. The second transmission part 221 is provided with the avoidance part for avoiding the first synchronous belt 310 which drives the first transmission part 211. Therefore, the first synchronous belt 310 and the second synchronous belt 410 are located in the same vertical plane, and the miniaturization of the sliding table module is achieved while making the two sliders move in the same direction or in opposite directions independently. Compared with the traditional sliding table system, the sliding table module provided by the present disclosure occupies less space and is suitable for application scenes with limited space or high space requirements. In addition, the first synchronous belt 310 is arranged in the extension direction of the transmission groove 141, and is in transmission connection with the first transmission part 211 after passing through the avoidance part. The second synchronous belt 410 is in transmission connection with the second transmission part 221, the first synchronous belt 310 is sleeved outside the second synchronous belt 410, and the first synchronous belt 310 and the second synchronous belt 410 are located in the same vertical plane, thus ensuring the synchronism of the sliders and the synchronous belts in the movement process, and improving the control accuracy.

Figure 2:
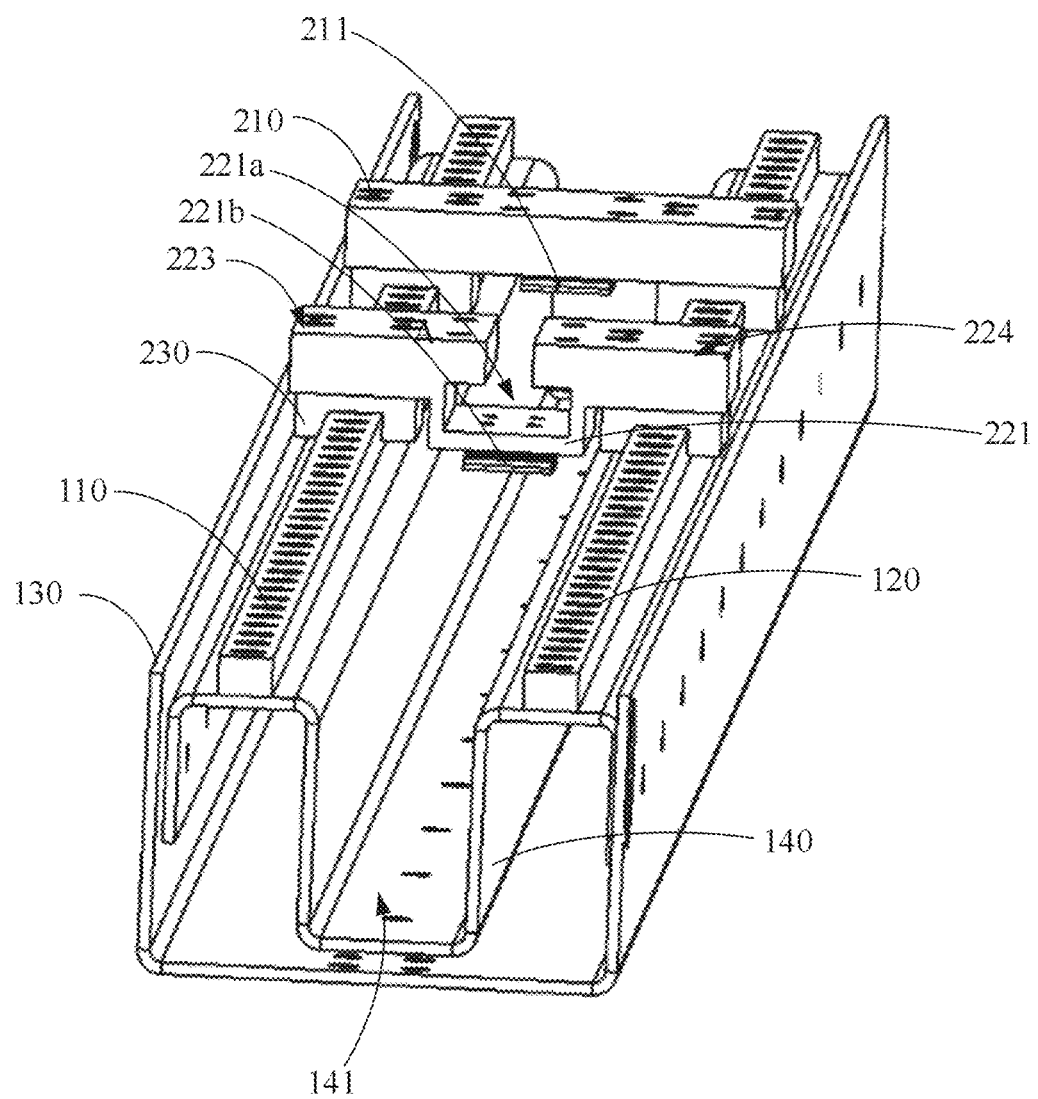
FIG. 2 is an assembly schematic diagram of a sliding table base module and a sliding table module in FIG. 1.

Referring to FIG. 2, in one embodiment, the second slider 220 is provided with a first sub-part 223 and a second sub-part 224 which are spaced from each other. The first sub-part 223 and the second sub-part 224 are arranged corresponding to the first slide rail 110 and the second slide rail 120, respectively. The second transmission part 221 is connected between the first sub-part 223 and the second sub-part 224, and the avoidance part is an avoidance groove 221a. One side, away from the avoidance groove 221a, of the second transmission part 221 is provided with a first positioning sub-part 221b, and the first positioning sub-part 221b is connected with the second synchronous belt 410. It may be understood that the second slider 220 is divided into the first sub-part 223 and the second sub-part 224. The first sub-part 223 and the second sub-part 224 are in correspondence with the first slide rail 110 and the second slide rail 120, respectively, thus improving the stability and accuracy of the sliding table module 200 on different tracks. Meanwhile, the dissembling between the second slider 220 and the first synchronous belt 310 is convenient, and the mounting efficiency is improved. The avoidance part is designed as the avoidance groove 221a to prevent the first synchronous belt 310 from radial jumping to make contact with the second slider 220, a sufficient working space is left without affecting the overall compact structure, and the stability and reliability of transmission are improved. The first positioning sub-part 221b is connected with the second synchronous belt 410 to ensure the stable connection between the second synchronous belt 410 and the second transmission part 221 and further enhance the stability of transmission, thus improving the accuracy and stability of the sliding table module 200.

Figure 3:
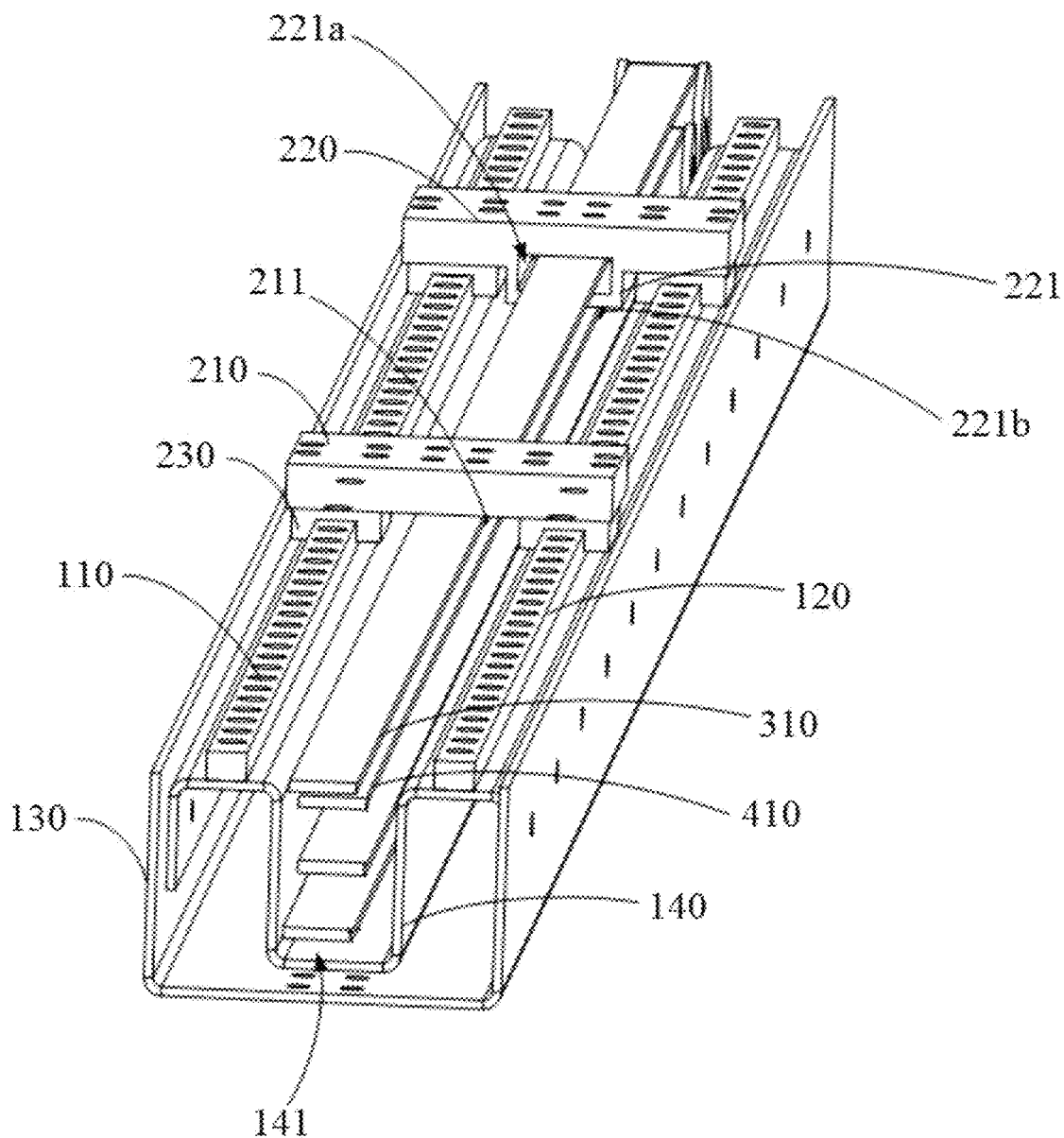
FIG. 3 is an assembly schematic diagram of the sliding table base module, the sliding table module, a first synchronous belt and a second synchronous belt in FIG. 1.

Referring to FIG. 1 to FIG. 3, in one embodiment, the sliding table base module 100 includes a mounting seat 130 and a sliding table body 140. The mounting seat 130 is provided with a mounting groove, and the sliding table body 140 is embedded into the mounting groove. A middle portion of the sliding table body 140 is recessed towards the mounting groove to form the transmission groove 141, and the first slide rail 110 and the second slide rail 120 are arranged on both sides of a notch of the transmission groove 141, respectively. In this embodiment, the mounting groove is formed in the mounting base 130, and the sliding table body 140 is embedded into the mounting groove, thus facilitating to mount and replace the sliding table body 140 quickly, and meanwhile, the stability and durability of the whole module structure are improved. The middle portion of the sliding table body 140 is recessed towards the mounting groove to form the transmission groove 141, such that the first slide rail 110 and the second slide rail 120 are located on both sides of the notch of the transmission groove 141, respectively, to protect the synchronous belt better and prevent the synchronous belt from being damaged by outside world. Meanwhile, the sliding table module 200 can move more smoothly and stably.

Referring to FIG. 2, in some embodiments, the sliding table module 200 further includes multiple sliders 230. The multiple sliders 230 are arranged between the first slider 210 as well as the second slider 220 and the first slide rail 110 and the second slide rail 120. The first slider 210 and the second slider 220 are fixedly connected with the sliders 230. It may be understood that in this embodiment, the sliding table module 200 is able to slide stably on the slide rail by arranging the sliders 230 between the first slider 210 as well as the second slider 220 and the first slide rail 110 as well as the second slide rail 120. Meanwhile, the first slider 210 and the second slider 220 are fixedly connected with the sliders 230, thus ensuring the movement consistency and accuracy of the sliding table module 200.

Specifically, in one embodiment, a body of the mounting seat 130 is a groove-shaped structure, which has a moderate plate thickness, gives consideration to both light weight and structural strength, and is provided with a positioning hole and an out-shaft end hole on the side surface. The sliding table body 140 employs a symmetric structure, the side surface of which is provided with a positioning hole to be fixedly connected with the mounting seat 130 in a matching manner. An upper end of the sliding table body 140 is provided with multiple threaded holes for mounting the first slide rail 110 and the second slide rail 120. The first slider 210 is provided in a flat shape and is provided with multiple threaded holes for being fixed with the sliders 230. The second slider 220 is a flat plate with a groove, and the size of the groove enables the first synchronous belt 310 run safely therein without making contact with the groove. During mounting, the sliding table body 140 is pushed from one side of the mounting seat 130 until the positioning holes of two components align with each other, and the screws are screwed to ensure the levelness of the first slide rail 110 and the second slide rail 120 at the upper portion. The first slide rail 110 and the second slide rail 120 are connected and fixed with an upper end face of the sliding table body 140 by the screws, and four sliders 230 are pushed in from one side of the first slider 210 or the second slide tabling 220 in pairs, making the balls smoothly meshed with the rails. Finally, the first slider 210 and the second slider 220 are fixed with the sliders 230 to complete the mounting of the whole sliding table module.

Figure 4:
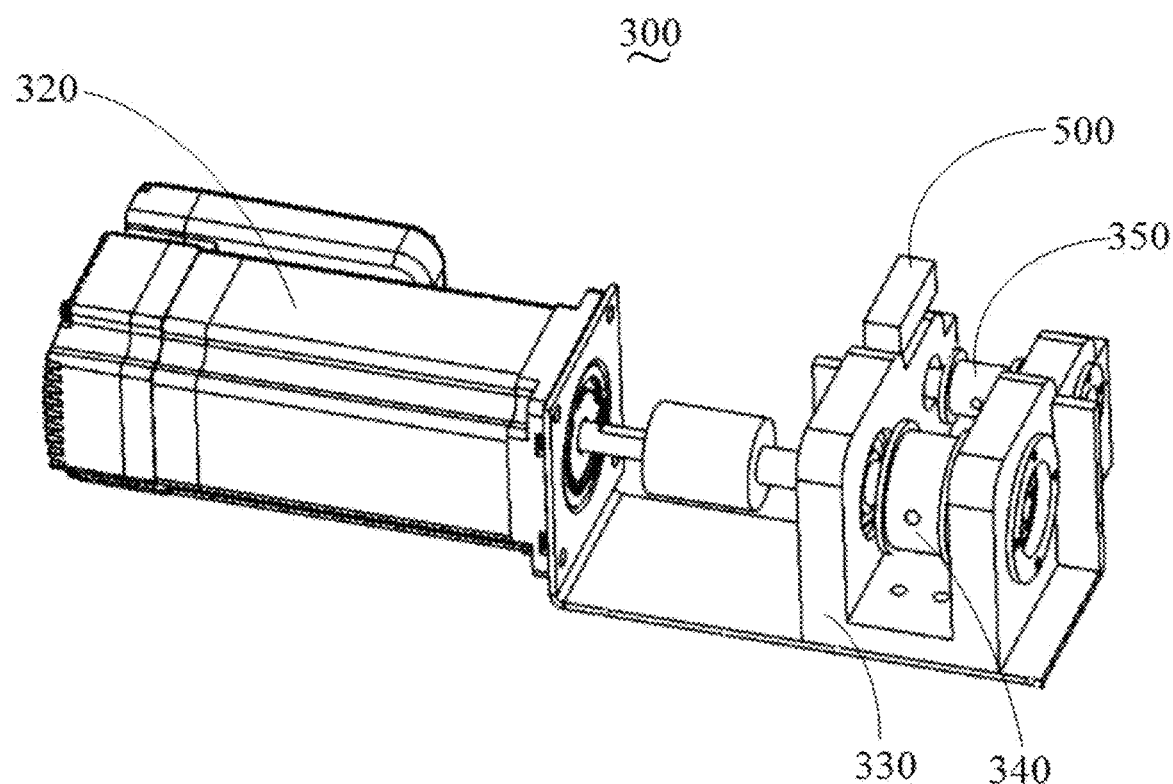
FIG. 4 is a structural schematic diagram of a first driving end module in FIG. 1.

Referring to FIG. 4, in an embodiment, the first driving end module 300 includes a first driving member 320, a first driving seat 330, a first driving shaft 340 and a first driven shaft 350. The first driving shaft 340 and the first driven shaft 350 are rotatably connected with the first driving seat 330, respectively. One end of the first synchronous belt 310 is sleeved on the first driving shaft 340, the second synchronous belt 410 is sleeved on the first driven shaft 350, and the first driving member 320 is configured to drive the first driving shaft 340 to drive the first synchronous belt 310 to rotate. It may be understood that the first driving end module 300 is configured to drive the first slider 210, and to facilitate the second driving end module 400 to drive the second slider 220 through a driven relationship. The first driving member 320 is configured to drive the first driving shaft 340 to rotate. Specifically, when the first driving member 320 receives a driving signal, the first driving member 320 rotates to drive the first driving shaft 340. The first driving seat 330 provides a component for fixing and supporting, which is configured to support and position the first driving shaft 340 and the first driven shaft 350. The first driving shaft 340 and the first driven shaft 350 are rotatably connected with the first driving seat 330. One end of the first synchronous belt 310 is sleeved on the first driving shaft 340, and the second synchronous belt 410 is sleeved on the first driven shaft 350. Therefore, the first driving end module 300 can control the position and the movement of the first slider 210, and cooperate with the second driving end module 400 to coordinate and connect the second synchronous belt 410.

Further, the first driving seat 330 is provided with a U-shaped groove, and is provided with bearing housing holes on both sides. One side of the first driving seat 330 is provided with a boss for fixing a bearing outer ring, and the bottom is provided with a positioning hole. The first driving end module 300 further includes a first connecting bracket, the first connecting bracket is a bent member, a lower plate surface is provided with a positioning hole for mounting the first driving seat 330, and a side surface is provided with a mounting hole for mounting the first driving member 320 which may be a motor or a hydraulic press and the like.

Figure 5:
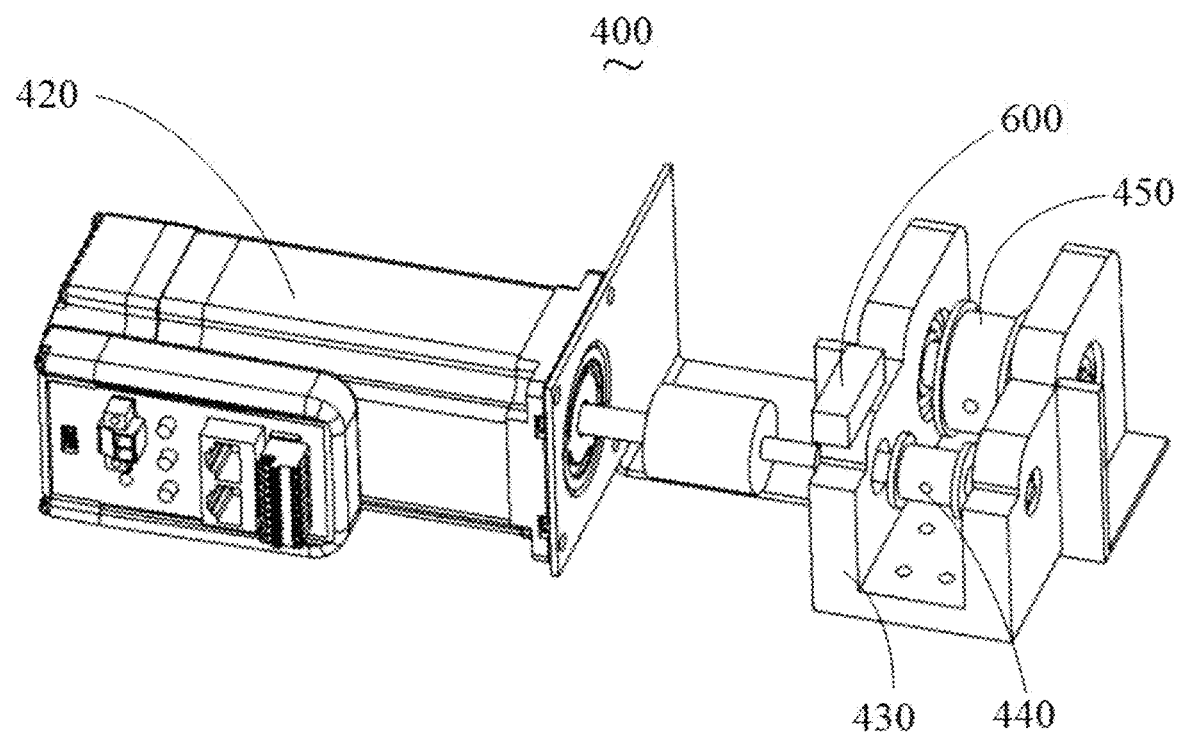
FIG. 5 is a structural schematic diagram of a second driving end module in FIG. 1.

Referring to FIG. 5, in one embodiment, the second driving end module 400 includes a second driving member 420, a second driving seat 430, a second driving shaft 440 and a second driven shaft 450. The second driving shaft 440 and the second driven shaft 450 are rotatably connected with the second driving seat 430, respectively. One end of the second synchronous belt 410 is sleeved on the second driving shaft 440, the first synchronous belt 310 is sleeved on the second driven shaft 350, and the second driving member 420 is configured to drive the second driving shaft 440 to drive the second synchronous belt 410 to rotate. It may be understood that the second driving end module 400 in this embodiment is used to drive the second slider 220, and to facilitate the first driving end module 300 to drive the first slider 210 through a driven relationship. The second driving member 420 is configured to drive the second driving shaft 440 to rotate. Specifically, when the second driving member 420 receives a driving signal, the second driving member 420 rotates to drive the second driving shaft 440. The second driving seat 430 provides a component for fixing and supporting, which is configured to support and position the second driving shaft 440 and the second driven shaft 450. The second driving shaft 440 and the second driven shaft 450 are rotatably connected with the second driving seat 430. One end of the second synchronous belt 410 is sleeved on the second driving shaft 440, and the first synchronous belt 310 is sleeved on the second driven shaft 450. Therefore, the second driving end module 400 can control a position and movement of the second slider 220, and cooperate with the first driving end module 300 to coordinate and connect the second synchronous belt 410.

Further, the second driving seat 430 is provided with a U-shaped groove, and is provided with bearing housing holes on both sides. One side of the second driving seat 430 is provided with a boss for fixing a bearing outer ring, and the bottom is provided with a positioning hole. The second driving end module 400 further includes a second connecting bracket, the second connecting bracket is a bent member, a lower plate surface is provided with a positioning hole for mounting the second driving seat 430, and a side surface is provided with a mounting hole for mounting the second driving member 420 which may be a motor or a hydraulic press and the like.

Figure 6:
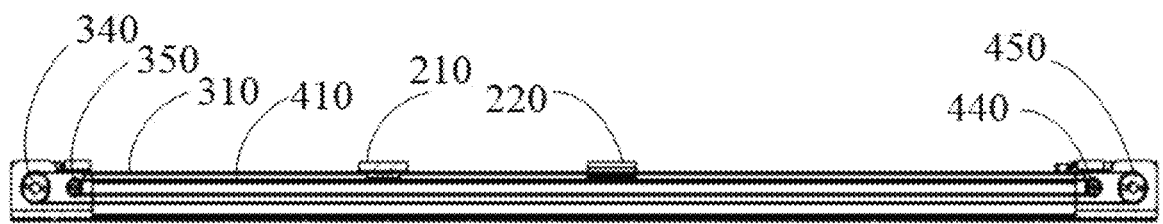
FIG. 6 is a longitudinal sectional diagram of the monorail independent dual-slider synchronous belt sliding table module component with a compact structure in FIG. 1.

Referring to FIG. 3 and FIG. 6, in one embodiment, the first driving shaft 340 and the first driven shaft 350 are arranged in parallel, and the first driven shaft 350 is arranged between the first driving shaft 340 and the sliding table module 200. The second driving shaft 440 and the second driven shaft 450 are arranged in parallel, and the second driving shaft 440 is arranged between the second driven shaft 450 and the sliding table module 200. It may be understood that the first driving shaft 340 and the first driven shaft 350 are arranged in parallel, and the first driven shaft 350 is arranged between the first driving shaft 340 and the sliding table module 200. The second driving shaft 440 and the second driven shaft 450 are arranged in parallel, and the second driving shaft 440 is arranged between the second driven shaft 450 and the sliding table module 200, such that the first synchronous belt 310 can be sleeved outside the second synchronous belt 410 to prevent the first synchronous belt 310 and the second synchronous belt 410 from interfering with each other when arranged in the same vertical plane, thus reducing the transverse size of the whole sliding table module, and making the whole system more compact. Meanwhile, the parallel arrangement of the first driving shaft 340 and the first driven shaft 350 and the parallel arrangement of the second driving shaft 440 and the second driven shaft 450 are also beneficial to improve the rigidity and stability of the system and avoid bending deformation caused by load or other factors.

Further, a radius of the first synchronous belt 310 is greater than that of the second synchronous belt 410. That is, the first synchronous belt 310 is sleeved outside the second synchronous belt 410 to prevent the first synchronous belt 310 and the second synchronous belt 410 from interfering with each other. By adjusting a ratio of the radius of the first synchronous belt 310 and the radius of the second synchronous belt 410 and the rotating speed of the first driving member 320 and the rotating speed of the second driving member 420, the movement rate of the first slider 210 and the movement rate of the second slider 220 can be adjusted.

Referring to FIG. 4 and FIG. 5, in one embodiment, the monorail independent dual-slider synchronous belt sliding table module component 10 with a compact structure further includes a first limit switch 500 and a second limit switch 600. The first limit switch 500 is arranged at one side, adjacent to the first slide rail 110 or the second slide rail 120, of the first driving end module 300, and the second limit switch 600 is arranged at one side, adjacent to the first slide rail 110 or the second slide rail 120, of the second driving end module 400. It may be understood that the first limit switch 500 is mounted at one side, adjacent to the first slide rail 110 or the second slide rail 120, of the first driving end module 300, and is configured for detecting positions of the the first slider 210 and the second slider 220 and triggering a corresponding control action when the first slider 210 or the second slider 220 moves to a preset position. The limit switch may be implemented through a trigger, a photosensor or other detection apparatuses. Similarly, the second limit switch 600 is mounted at one side, adjacent to the first slide rail 110 or the second slide rail 120, of the second driving end module 400, and is configured for detecting positions of the the first slider 210 and the second slider 220 a corresponding control action. In this way, by arranging the first limit switch 500 and the second limit switch 600 at both ends of the sliding table base module 100, respectively, the movement ranges of the first slider 210 and the second slider 220 are limited and monitored, thus ensuring that the sliding table module component operates in a safe and predetermined working range. When the first slider 210 and the second slider 220 reach the preset positions, the limit switches send signals to a control system to trigger stop, reverse or other necessary operations, thus improving the stability and reliability of the sliding table module component.

In the present disclosure, unless otherwise specified and limited, the first feature "above" or "below" the second feature may include that the first feature is in direct contact with the second feature, or may include that the first feature and the second feature are in contact with each other through an intermediate medium. Moreover, the first feature is "above", "on" and "over" the second feature, including that the first feature is above and at an inclined top of the second feature, or only indicating that a horizontal height of the first feature is higher than that of the second feature. The first feature is "below", "under" and "beneath" the second feature, including that the first feature is below and at an inclined bottom of the second feature, or only indicating that a horizontal height of the first feature is lower than that of the second feature.

In the description of this specification, descriptions referring to the terms "one embodiment", "some embodiments", "examples", "specific examples" or "some examples" mean that specific features, structures, materials or characteristics described in connection with this embodiment or example are included in at least one embodiment or example of the present disclosure. In this specification, the schematic representations of the above terms are not necessarily aimed at the same embodiment or example. Moreover, specific features, structures, materials or characteristics described may be combined in any one or more embodiments or examples in a suitable manner. In addition, those skilled in the art can bind and combine different embodiments or examples and features of different embodiments or examples described in this specification without contradicting each other.

Finally, it should be noted that the above embodiments are only used to illustrate the technical solution of the present disclosure rather than limiting. Although the present disclosure has been described in detail with reference to the foregoing embodiments, those of ordinary skill in the art should understand that it is still possible to modify the technical solution described in the foregoing embodiments, or to replace some technical features with equivalents. However, these modifications or substitutions do not make the essence of the corresponding technical solutions deviate from the spirit and scope of the technical solutions of various embodiments of the present disclosure.

What is claimed is:

1. A monorail independent dual-slider synchronous belt sliding table module component with a compact structure, comprising:
    a sliding table base module, provided with a first slide rail and a second slide rail arranged in parallel, wherein the first slide rail and the second slide rail are spaced from each other to form a transmission groove;
    a sliding table module, connected with the first slide rail and the second slide rail and capable of moving in an extension direction of the sliding table base module, wherein the sliding table module comprises a first slider and a second slider, the first slider is provided with a first transmission part corresponding to the transmission groove, the second slider is convexly provided with a second transmission part corresponding to the transmission groove, and the second transmission part is provided with an avoidance part which is located in a same horizontal plane as the first transmission part;
    a first driving end module, arranged at one end of the sliding table base module, wherein the first driving end module comprises a first synchronous belt which is arranged in an extension direction of the transmission groove and is in transmission connection with the first transmission part after passing through the avoidance part; and
    a second driving end module, arranged at an other end of the sliding table base module, wherein the second driving end module comprises a second synchronous belt which is in transmission connection with the second transmission part, the first synchronous belt is sleeved outside the second synchronous belt, and the first synchronous belt and the second synchronous belt are located in a same vertical plane;
    wherein the second slider is provided with a first sub-part and a second sub-part which are spaced from each other; the first sub-part and the second sub-part are arranged corresponding to the first slide rail and the second slide rail, respectively; the second transmission part is connected between the first sub-part and the second sub-part, and the avoidance part is an avoidance groove; one side, away from the avoidance groove, of the second transmission part is provided with a first positioning sub-part, and the first positioning sub-part is connected with the second synchronous belt.

2. The monorail independent dual-slider synchronous belt sliding table module component with a compact structure according to claim 1, wherein the sliding table base module comprises a mounting seat and a sliding table body; the mounting seat is provided with a mounting groove, and the sliding table body is embedded into the mounting groove; a middle portion of the sliding table body is recessed towards the mounting groove to form the transmission groove, and the first slide rail and the second slide rail are arranged on both sides of a notch of the transmission groove respectively.

3. The monorail independent dual-slider synchronous belt sliding table module component with a compact structure according to claim 1, wherein the sliding table module further comprises a plurality of sliders, the plurality of sliders are arranged between the first slider as well the second slider and the first slide rail as well as the second slide rail, and the first slider and the second slider are fixedly connected with the plurality of sliders.

4. The monorail independent dual-slider synchronous belt sliding table module component with a compact structure according to claim 1, wherein the first driving end module comprises a first driving member, a first driving seat, a first driving shaft and a first driven shaft; the first driving shaft and the first driven shaft are rotatably connected with the first driving seat; one end of the first synchronous belt is sleeved on the first driving shaft, the second synchronous belt is sleeved on the first driven shaft, and the first driving member is configured to drive the first driving shaft to drive the first synchronous belt to rotate.

5. The monorail independent dual-slider synchronous belt sliding table module component with a compact structure according to claim 4, wherein the first driving shaft and the first driven shaft are arranged in parallel, and the first driven shaft are arranged between the first driving shaft and the sliding table module.

6. The monorail independent dual-slider synchronous belt sliding table module component with a compact structure according to claim 4, wherein the second driving end module comprises a second driving member, a second driving seat, a second driving shaft and a second driven shaft; the second driving shaft and the second driven shaft are rotatably connected with the second driving seat; one end of the second synchronous belt is sleeved on the second driving shaft, the first synchronous belt is sleeved on the second driven shaft, and the second driving member is configured to drive the second driving shaft to drive the second synchronous belt to rotate.

7. The monorail independent dual-slider synchronous belt sliding table module component with a compact structure according to claim 6, wherein the second driving shaft and the second driven shaft are arranged in parallel, and the second driving shaft is arranged between the second driven shaft and the sliding table module.

8. The monorail independent dual-slider synchronous belt sliding table module component with a compact structure according to claim 1, wherein a radius of the first synchronous belt is greater than a radius of the second synchronous belt.

9. The monorail independent dual-slider synchronous belt sliding table module component with a compact structure according to claim 1, further comprising a first limit switch and a second limit switch, wherein the first limit switch is arranged at one side, adjacent to the first slide rail or the second slide rail, of the first driving end module, and the second limit switch is arranged at one side, adjacent to the first slide rail or the second slide rail, of the second driving end module.

10. The monorail independent dual-slider synchronous belt sliding table module component with a compact structure according to claim 2, wherein the first driving end module comprises a first driving member, a first driving seat, a first driving shaft and a first driven shaft; the first driving shaft and the first driven shaft are rotatably connected with the first driving seat; one end of the first synchronous belt is sleeved on the first driving shaft, the second synchronous belt is sleeved on the first driven shaft, and the first driving member is configured to drive the first driving shaft to drive the first synchronous belt to rotate.

11. The monorail independent dual-slider synchronous belt sliding table module component with a compact structure according to claim 3, wherein the first driving end module comprises a first driving member, a first driving seat, a first driving shaft and a first driven shaft; the first driving shaft and the first driven shaft are rotatably connected with the first driving seat; one end of the first synchronous belt is sleeved on the first driving shaft, the second synchronous belt is sleeved on the first driven shaft, and the first driving member is configured to drive the first driving shaft to drive the first synchronous belt to rotate.

12. The monorail independent dual-slider synchronous belt sliding table module component with a compact structure according to claim 2, wherein a radius of the first synchronous belt is greater than a radius of the second synchronous belt.

13. The monorail independent dual-slider synchronous belt sliding table module component with a compact structure according to claim 3, wherein a radius of the first synchronous belt is greater than a radius of the second synchronous belt.

14. The monorail independent dual-slider synchronous belt sliding table module component with a compact structure according to claim 2, further comprising a first limit switch and a second limit switch, wherein the first limit switch is arranged at one side, adjacent to the first slide rail or the second slide rail, of the first driving end module, and the second limit switch is arranged at one side, adjacent to the first slide rail or the second slide rail, of the second driving end module.

15. The monorail independent dual-slider synchronous belt sliding table module component with a compact structure according to claim 3, further comprising a first limit switch and a second limit switch, wherein the first limit switch is arranged at one side, adjacent to the first slide rail or the second slide rail, of the first driving end module, and the second limit switch is arranged at one side, adjacent to the first slide rail or the second slide rail, of the second driving end module.

* * * * *